July 10, 1951          J. A. DIEHL          2,560,036
CASTOR WHEEL TIRE CONSTRUCTION
Filed Dec. 11, 1946
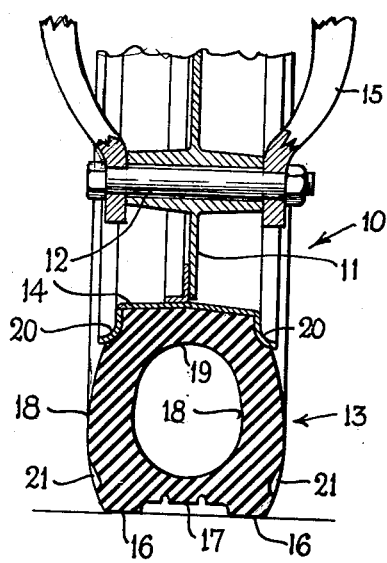
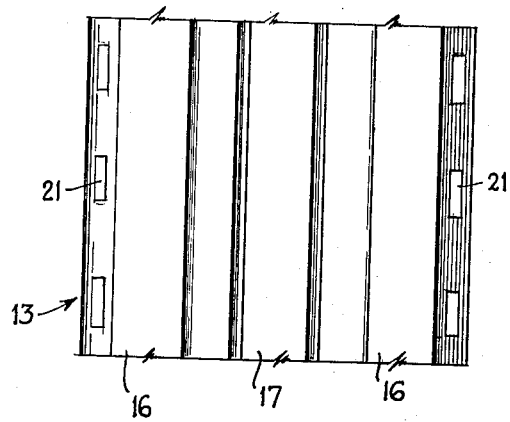
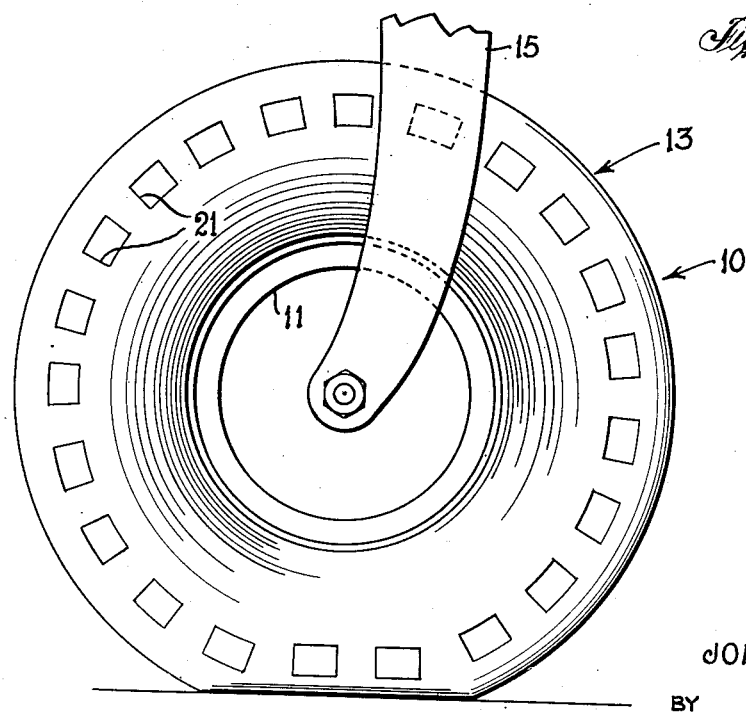
INVENTOR
JOHN A. DIEHL
BY
ATTORNEYS Patented July 10, 1951

2,560,036

UNITED STATES PATENT OFFICE 2,560,036

CASTOR WHEEL TIRE CONSTRUCTION

John A. Diehl, Cuyahoga Falls, Ohio, assignor to The Firestone Tire & Rubber Company, Akron, Ohio, a corporation of Ohio Application December 11, 1946, Serial No. 715,565

2 Claims. (Cl. 152—327)

This invention relates generally to tire constructions, especially to a semi-pneumatic tire for use on a castor wheel, or the like.

Heretofore, in many instances, castor wheels and other wheels have been supported in such a way that they and their mounting shafts and yokes are rotatable as a unit centered in a vertical support socket that is carried by an article supported by the wheel. Thus, when the article supported by the castor is moved, the castor wobbles and vibrates appreciably, causing difficulty in steering and moving the supported article. This action of the castor also wears away the surfaces of the tire much more rapidly and irregularly than if the castor wheels would run in straight lines parallel to the path of the supported article. Various types of hard and solid rubber tires for castors have previously been produced, but such tires do not have the load supporting characteristics desired for many uses, nor do they prevent the castors from wobbling.

The general object of this invention is to overcome the foregoing and other disadvantages of and objections to known types of castor tire constructions, and to provide a novel, improved semi-pneumatic tire, especially suitable for use on castors.

Another object of the invention is to provide a tire and tread construction for use on wheels that are positioned by freely rotatable means, which tread acts to maintain the tire in a centered position with relation to the means used to mount such wheels.

Another object of the invention is to provide an inexpensive, uncomplicated, easily constructed tread for a castor.

Yet another object of the invention is to provide a tire and tread construction adapted to provide two spaced vertical columns for load support with one column being on each side of the tire's centerline in spaced relation thereto.

A further object of the invention is to provide a castor wheel which automatically runs in a straight line and which will have maximum life.

The foregoing and other objects and advantages of the invention, which will be made apparent as the specification proceeds, are achieved, generally speaking, by the use of a semi-pneumatic tire construction that primarily comprises a tire body and a tread which has a continuous rib positioned on each side of the centerline of the tire at the lateral margins of the tire and with such ribs being the only portions of the tire tread normally in contact with the ground when the tire is positioned in normal load carrying manner, which ribs are in vertical alignment with load transmitting sidewalls of the tire.

Reference now is directed to the accompanying drawings, wherein:

Fig. 1 is a fragmentary vertical section of a castor wheel embodying the principles of the invention;

Fig. 2 is a side elevation of the wheel of Fig. 1; and

Fig. 3 is a plan of the tread of the invention.

With specific reference to the details shown in the drawings, a support assembly, such as a castor unit 10, is provided, which unit includes a wheel 11 that is of conventional construction and which is suitably positioned on a support shaft 12. The wheel 11 normally is made from metal and mounts a castor tire, such as the semi-pneumatic tire 13. This tire 13 is mounted on a rim section 14 of the wheel 11 in any conventional manner and usually is vulcanized when in engagement with the wheel 11, as this gives a solid, strong mount for the tire. Usually a conventional bonding agent, such as Ty-ply, is used to aid in securing the semi-pneumatic tire 13 to the wheel.

The castor unit 10 may be mounted in any conventional manner, or it may be secured to an article such as a hand truck so as to support it, and to this end, a yoke 15 may engage with the shaft 12 and straddle and extend upwardly from the tire 13 to engage with a suitable socket or other positioning means on the article to be supported whereby the castor unit of the invention is adapted to carry a vertically directed load but still be freely mounted in its mounting means for rotational movement on its positioning axis. Such wheel 11 will not normally be steered by any external means but will be adapted to position itself with relation to the direction of the forces supplied thereto as hereafter more fully explained.

The primary feature of the present invention is that a plurality of circumferentially continuous ribs 16 are formed on the tire 13 with one of the ribs 16 being positioned at the lateral margin of the tire on each side of the tire's centerline. A recessed tread surface 17 is provided in the tread between the ribs 16 and this tread portion may be of any desired configuration. Such tread section 17 is normally not in contact with the ground, or other supporting surface and tread contact is maintained solely through the ribs 16.

As a further feature of the invention and to form load support columns in the tire, the tire 13 has vertically directed side walls 18 that connect the tread sections 16 and 17 to a base section 19. This base section 19 of the tire 13 is snugly engaged with flanges 20 of the rim 14 at its lateral margins. Thus load is transmitted through the rim 14 and flanges 20 to the side walls 18 that serve as vertical load transmitting columns. The load is carried at the lateral margins of the tire on the ribs 16 so that the tire 13 forms two vertical load support columns with one column being on and spaced from each side of the centerline of the tire.

In order to reenforce the ribs 16 against lateral deflection, a plurality of radially directed ribs 21 may be formed on the radially and laterally outer portion of the tire 13, which ribs 21 blend smoothly in with the side walls of the tire and extend up and unite with the laterally outer portions of the ribs 16. Fig. 1 of the drawings shows the position of the tire 13 when loaded and Fig. 3 of the drawings shows the tread plan of the castor unit of the invention.

The special tread construction illustrated herein, wherein a continuous ground engaging member is formed on each side of the center line of the supported unit or tire, has the desirable characteristic of automatically setting up a righting couple on the support unit 10 when it is rotated and is not directly parallel to the force applied to the article supported thereby. This automatic couple set up by the tread ribs 16 will maintain the castor units 10 continuously parallel to the force used to move the supported article and ease movement of the article. By maintaining the tire 13 parallel to the force applied to a support assembly, the tire will function to run smoothly and will have even wear over its tread surface. This insures that maximum tread wear will be obtained.

While the tire 13 is shown as being of the type known as a "semi-pneumatic tire," the invention is not limited to such tire construction because in some instances it may be desirable to use the tread of the invention on a solid tire while in other instances the tread may be formed on fully pneumatic tires. Likewise, the tire on which the tread is formed can be used for any desired purpose although one use for which the tire of the invention is especially suited is that of a castor wheel, such as that shown herein.

In accordance with the patent statutes, I have illustrated and described one complete embodiment of my invention in detail, but it will be understood the invention is not limited to the specific embodiment of the invention shown herein. The scope of the invention is defined solely by the appended claims.

What is claimed is:

1. In a tire for a castor wheel, a base, sidewalls and a tread portion, said tire having a centrally located endless airtight chamber of substantial cross-sectional area extending circumferentially thereof, said base being vulcanized to a tire rim upon which the tire is mounted, the combined thickness of said sidewalls being equal to approximately one-half of the greatest cross-sectional width of said tire, said sidewalls being radially disposed between said tread and base portion in a plane substantially at right angle to the axis of the tire, said tread portion comprising high shoulder ribs with one rib disposed at each edge of the tread in radial alignment with one of said sidewalls, said ribs defining a central groove therebetween of a width substantially equal to the total width of said ribs at their road-contact surface.

2. In a tire of the class described, a base, sidewalls and a tread portion, said tire having a centrally located endless airtight chamber of substantial cross-sectional area extending circumferentially thereof, said base being vulcanized to a tire rim upon which the tire is mounted, the combined thickness of said sidewalls being equal to approximately one-half of the greatest cross-sectional width of said tire, said walls being radially disposed between said tread and base portion in a plane substantially at right angle to the axis of the tire, said tread portion comprising high shoulder ribs with one rib disposed at each edge of the tread in radial alignment with one of said sidewalls, said ribs defining a central groove therebetween of a width substantially equal to the total width of said ribs at their road-contact surface, and a plurality of radially extending reinforcing ribs integrally bonded to the tire on its radially outer lateral walls and connecting to the shoulder ribs at circumferentially spaced points.

JOHN A. DIEHL.

REFERENCES CITED

The following references are of record in the file of this patent:

UNITED STATES PATENTS

| Number | Name | Date |
|---|---|---|
| 223,846 | Fiset | Jan. 27, 1880 |
| 453,520 | Straus | June 2, 1891 |
| 687,838 | Keiper | Dec. 3, 1901 |
| 711,081 | Stevens | Oct. 14, 1902 |
| 1,445,014 | Gammeter | Feb. 13, 1923 |
| 1,533,339 | Robb | Apr. 14, 1925 |
| 1,557,324 | Pestunowitz | Oct. 13, 1925 |
| 1,560,551 | Eger | Nov. 10, 1925 |
| 1,581,590 | Moore | Apr. 20, 1926 |
| 1,716,311 | Harris | June 4, 1929 |